United States Patent
Hirschmann et al.

(10) Patent No.: US 9,172,236 B2
(45) Date of Patent: Oct. 27, 2015

(54) OVERVOLTAGE PROTECTION DEVICE HAVING AT LEAST ONE SURGE ARRESTER

(75) Inventors: Helmut Hirschmann, Berg (DE); Georg Wittmann, Lauterhofen (DE); Edmund Zäuner, Berching/Pollanten (DE)

(73) Assignee: DEHN + SÖHNE GmbH + Co. KG, Neumarkt/Opf. (DE)

(*) Notice: Subject to any disclaimer, the term of this patent is extended or adjusted under 35 U.S.C. 154(b) by 164 days.

(21) Appl. No.: 13/983,118

(22) PCT Filed: Dec. 7, 2011

(86) PCT No.: PCT/EP2011/072131
§ 371 (c)(1),
(2), (4) Date: Sep. 27, 2013

(87) PCT Pub. No.: WO2012/110135
PCT Pub. Date: Aug. 23, 2012

(65) Prior Publication Data
US 2014/0313632 A1    Oct. 23, 2014

(30) Foreign Application Priority Data
Feb. 18, 2011 (DE) .......................... 10 2011 011 717
Apr. 26, 2011 (DE) .......................... 10 2011 018 556

(51) Int. Cl.
*H02H 3/08* (2006.01)
*H01C 7/12* (2006.01)
(Continued)

(52) U.S. Cl.
CPC ................ *H02H 3/085* (2013.01); *H01C 7/12* (2013.01); *H01C 7/126* (2013.01); *H01H 83/10* (2013.01); *H01T 1/14* (2013.01); *H01H 1/14* (2013.01)

(58) Field of Classification Search
CPC .......... H02H 3/085; H01C 7/12; H01C 7/126; H01H 83/10; H01H 1/14; H01T 1/14
USPC ....................................................... 361/131
See application file for complete search history.

(56) References Cited

U.S. PATENT DOCUMENTS

| 4,801,772 A * | 1/1989 | Bratkowski et al. ........... 218/117 |
| 7,567,417 B2 | 7/2009 | Groth et al. .................... 361/131 |

(Continued)

FOREIGN PATENT DOCUMENTS

| DE | 295 19 313 | 1/1996 | ............... H01C 7/12 |
| DE | 10 2006 031 229 | 12/2007 | ............... H02H 3/20 |

(Continued)

OTHER PUBLICATIONS

The International Search Report (in English), dated Feb. 14, 2012, the Written Opinion of the International Searching Authority, in English, dated Aug. 21, 2013, and the Notification Concerning Transmittal of the International Preliminary Report on Patentability, in English, dated Aug. 21, 2013 which issued from the ISA/European Patent Office for corresponding PCT Application No. PCT/EP2011/072131, filed on Dec. 7, 2011 each of which being from the World Intellectual Property Organization (WIPO).

(Continued)

*Primary Examiner* — Scott Bauer
(74) *Attorney, Agent, or Firm* — Gerald T. Bodner (57) ABSTRACT

The invention relates to an overvoltage protection device, comprising at least one surge arrester and one switchgear assembly, which is connected in series to the surge arrester and which can be triggered thermally, wherein the aforementioned components form a structural unit, and the thermal tripping means is arranged in the area of the expected heating up of the surge arrester when overloaded. According to the invention, the thermal tripping unit is configured as a stop element through which operating current or surge current does not flow. In the event of thermal overload, the stop element opens a releasing device of the switchgear assembly, wherein said switchgear assembly has an increased self-extinguishing capacity.

12 Claims, 11 Drawing Sheets

(51) Int. Cl.
*H01H 83/10* (2006.01)
*H01T 1/14* (2006.01)
*H01H 1/14* (2006.01)

(56) References Cited

U.S. PATENT DOCUMENTS

| | | | |
|---|---|---|---|
| 7,684,166 B2 * | 3/2010 | Donati et al. | 361/118 |
| 8,009,401 B2 | 8/2011 | Domejean et al. | 361/124 |
| 8,031,456 B2 * | 10/2011 | Wang | 361/118 |
| 8,378,778 B2 * | 2/2013 | Duval et al. | 338/20 |
| 8,477,469 B2 | 7/2013 | Depping et al. | 361/127 |
| 2006/0145807 A1 | 7/2006 | Gautier | 337/36 |
| 2006/0245125 A1 * | 11/2006 | Aszmus | 361/56 |
| 2007/0253136 A1 | 11/2007 | Groth et al. | 361/127 |
| 2009/0213518 A1 | 8/2009 | Domejean et al. | 361/111 |
| 2009/0302992 A1 * | 12/2009 | Cernicka | 337/412 |
| 2011/0205011 A1 * | 8/2011 | Ehrhardt et al. | 337/14 |

FOREIGN PATENT DOCUMENTS

| | | | |
|---|---|---|---|
| DE | 10 2007 006 617 | 9/2008 | H01C 1/14 |
| DE | 10 2009 036 125 | 2/2011 | H01C 7/12 |
| EP | 0905839 | 3/1999 | H01C 7/10 |
| EP | 1447831 | 8/2004 | H01H 83/10 |
| EP | 1774630 | 4/2007 | H01T 1/14 |
| EP | 2065914 | 6/2009 | H01H 83/10 |
| EP | 2096657 | 9/2009 | H01H 71/20 |

OTHER PUBLICATIONS

Official Communication from the Patent Office in Germany, an Office Action, dated Dec. 20, 2013, for priority German Patent Application No. DE 10 2011 018 556.9, filed on Apr. 26, 2011, with an English translation thereof.

* cited by examiner

OVERVOLTAGE PROTECTION DEVICE HAVING AT LEAST ONE SURGE ARRESTER

The invention relates to an overvoltage protection device comprising at least one surge arrester and a thermally triggerable switching device which is connected in series with the surge arrester, wherein the aforementioned components form a unit and the thermal triggering means is arranged in the area of the expected heating of the surge arrester when same is overloaded, according to the preamble of claim 1.

A surge arrester based on varistors is already known from DE 295 19 313 U1 where inadmissible heat generated at the varistor in the event of a failure is directly transferred to a thermal trigger device. To this end, a support wall is provided in the plug-in part. The varistor is mounted on one side of the support wall and the thermal trigger device as well as the associated switching means is mounted on the other side of the support wall. Thus, the thermal trigger device is placed opposite the varistor. In one embodiment one or more connecting lugs are passed through the partition wall into the area in which the thermal trigger device and the corresponding switching means are located.

The operating current and the occurring overload currents are carried via contact means of a plug-in part, the plug-in part being insertable into a base part. The current flows via the switching means to the varistor in such a way that the actual thermal trigger device, too, in particular a solder, is flown through by a current.

The whole embodiment and construction according to the teaching of DE 295 19 313 U1 can switch only very low currents. If short-circuit currents occur, or in direct voltage applications, an additional external switching member is necessary, for instance in the form of a separate switching means or a fuse.

EP 1 447 831 B1 or EP 2 065 914 A1 describe constructional combinations of overvoltage plug-in parts with additional switching devices which are either inserted into one common basic housing or are surrounded by such a basic housing. The solutions described in the above-cited prior art show a triggering, respectively switching-off behavior that is not adapted to the special properties of the respectively used surge arresters, e.g. varistors.

In the overvoltage protection device according to EP 2 096 657 A1 initially a thermal disconnection device with arc-quenching properties is provided. In addition, a second switching device is formed with arc splitters. This prior art corresponds to a switching device which was extended by an overvoltage protection function and which only has limited performance data and is suited only for special applications.

From a summary of the prior art it appears that thermal disconnection devices are usually configured to monitor the aging behavior of voltage-limiting components, e.g. varistors, and react if the temperature rises above a critical point. During the disconnection process usually only very low currents flow, in the milliampere range up to a maximum in the one-digit ampere range. Thus, the switching capacity of classical thermal disconnection devices is only within this low current range.

Overload cases and/or fault cases of surge arresters may, according to practical experience, also result in a total failure, respectively fusing of the overvoltage-limiting components. The short-circuit current from the connected supply source then occurring has to be interrupted or switched off by protection devices arranged upstream thereof, e.g. a fuse or a mechanical switching device, so as to obtain a back-up protection function.

According to EP 1 447 831 B1 the flow of the short-circuit current is interrupted by a corresponding special switching device.

The combination of overvoltage protection devices including a fuse, respectively mechanical switching device has the disadvantage that the response and triggering of these elements always requires the flow of a short-circuit current, meaning a multiple nominal current of the switching device, respectively fuse.

This current, which is normally in the range of several hundred ampere or goes up into the kiloampere range, can lead to the destruction or explosion of the overvoltage-limiting components and represent a fire hazard for the device itself or neighboring apparatus.

Thus, if the occurring fault current in an overvoltage protection device is greater than the one that can be quenched by the thermal disconnection device itself, but smaller than the release current of back-up protection devices, such as a fuse, it is possible that the arrester is destroyed with the above-mentioned consequences.

Based on the foregoing it is, therefore, the object of the invention to provide a further developed overvoltage protection device comprising at least one surge arrester and a thermally triggerable switching device which is connected in series with the surge arrester, wherein the condition of the surge arrester used, e.g. a varistor, is detected according to its operating and overload behavior and the overvoltage-limiting component is switched off before a total failure or a destruction occurs.

According to the invention, occurring mains-related fault currents or short-circuit currents not yet resulting in the triggering of external fuses are to be automatically switched off by the integrated switching device, so that an extended, gap-free self-protection zone is obtained.

The solution to the object of the invention is achieved by an overvoltage protection device according to the feature combination of patent claim 1. The dependent claims define at least useful embodiments and further developments.

Accordingly, there is proposed an overvoltage protection device comprising at least one surge arrester and a thermally triggerable switching device which is connected in series with the surge arrester, wherein the aforementioned components form a unit and the thermal triggering means is arranged in the area of the expected heating of the surge arrester when same is overloaded.

According to the invention, in contrast to the known prior art, the thermal trigger means is configured as a stop part not flown through by the operating current or surge current, which releases an unlocking mechanism of the switching device in the event of a thermal overload. As compared to the prior art, same has an increased self-quenching capacity.

The aforementioned stop part is thermally and mechanically coupled to the surge arrester and blocks the path of motion of an unlocking slide.

The switching device includes two opposite engaging contact pieces, wherein at least one of the contact pieces is configured to be movable and spring-preloaded in the opening direction of the switching device. The closed condition of the switching device is secured by the unlocking mechanism and can be released by the thermal trigger means so as to open the switching device. In one modification of the embodiment the contact pieces are bolt-type elements made of a conductive, preferably metallic material.

According to the invention, if the switching device is opened, i.e. if the contact pieces move apart from each other relatively, a disconnecting member penetrates into the resulting distance space. This disconnecting member may be made of an insulating, quenching gas delivering material, e.g. POM.

The insulating disconnecting member, too, is subjected to a spring preload so as to penetrate into the distance space fast and well-directed in the opening case. The end of the disconnecting member pointing to the distance space may be formed as a disconnecting wedge or as a portion provided with a chamfer.

At least portions of the contact pieces are located inside a molded body defining an arc chamber, wherein the molded body includes a shoulder oriented at an angle that deviates from the direction of motion of the movable contact piece. This orientation may be a 90° orientation. For receiving the contact pieces the molded body is provided with receiving spaces.

The shoulder is also provided with a hollow space to receive the disconnecting member and the spring device which produces the preload force.

The surfaces of the contact pieces of the switching device facing towards each other may have a contour so as to increase the current transition surface and reduce the transition resistance.

In one embodiment the surfaces may be formed as an engaging cone and counter-cone.

The unlocking slide, which is preferably made of a plastic material or fabricated as an injection molded plastic part, bears against the stop part, on the one hand, and fixes the switching device, on the other hand, i.e. the movable, spring-preloaded contact piece.

The unlocking slide additionally includes a nose-type portion which secures the spring-preloaded contact piece of the switching device.

In the region of the spring-preloaded contact piece which is secured by the nose-type portion of the unlocking slide a flexible electrical connecting means is attached which then leads to a terminal on the surge arrester.

The molded body, the hollow space and the disconnecting member are preferably configured to realize a gas-proof seclusion in particular when the switching device is opened, so that a quasi encapsulated arc chamber, respectively corresponding arc quenching chamber are obtained.

The moving process of the movable contact piece may be supported by the pressure effect of the produced arc.

The invention will be explained in more detail below by means of an embodiment and with the aid of the figures. In the drawings.

Figure 1A:
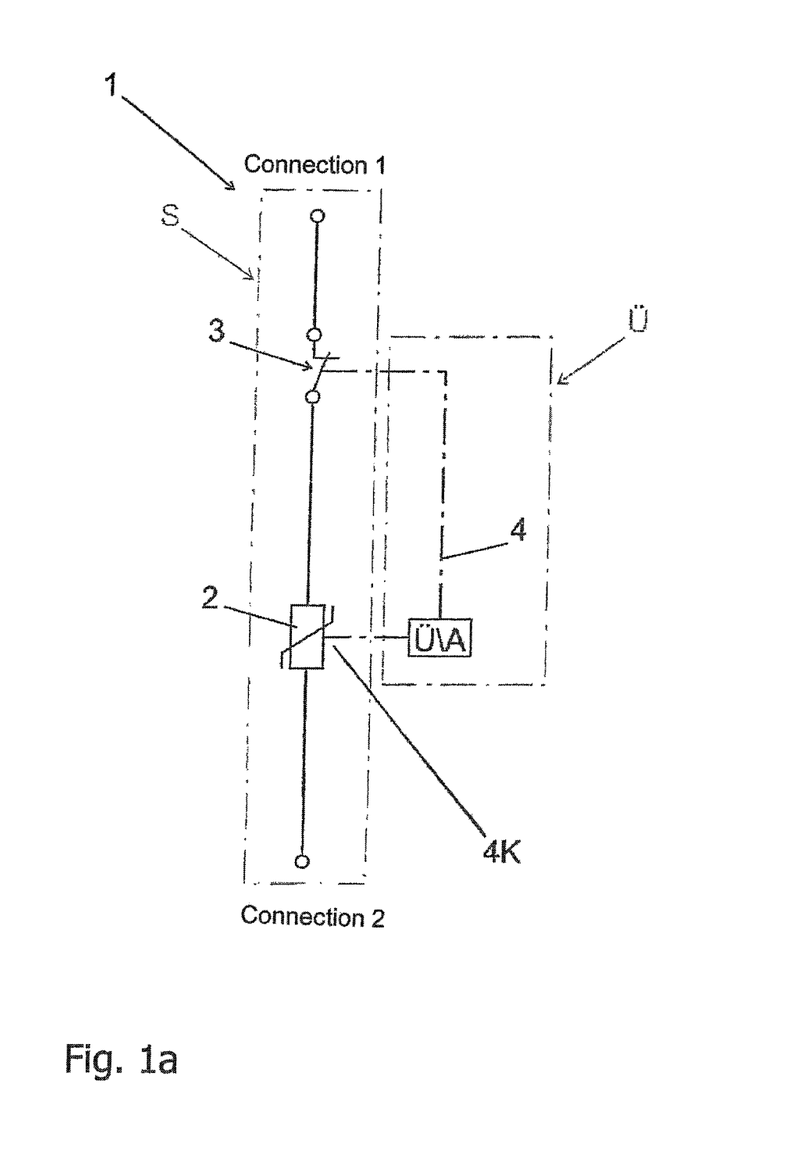
FIG. 1a shows a schematic diagram of the solution according to the invention, wherein a monitoring circuit Ü and the operating or surge current circuit S are functionally separated.

The representation of the schematic diagram of FIG. 1a is based on an overvoltage protection means 1 in which the operating surge current path S and the monitoring path Ü are functionally separated. The integrated switching device 3 is provided with an extended self-switching and self-quenching capacity, with reference number 2 denoting the surge arrester, configured for instance in the form of a varistor. Reference number 4 in FIG. 1a symbolizes the unlocking mechanism of the switching device 3, and 4K denotes the thermal coupling element as thermal trigger means.

Figure 1B:
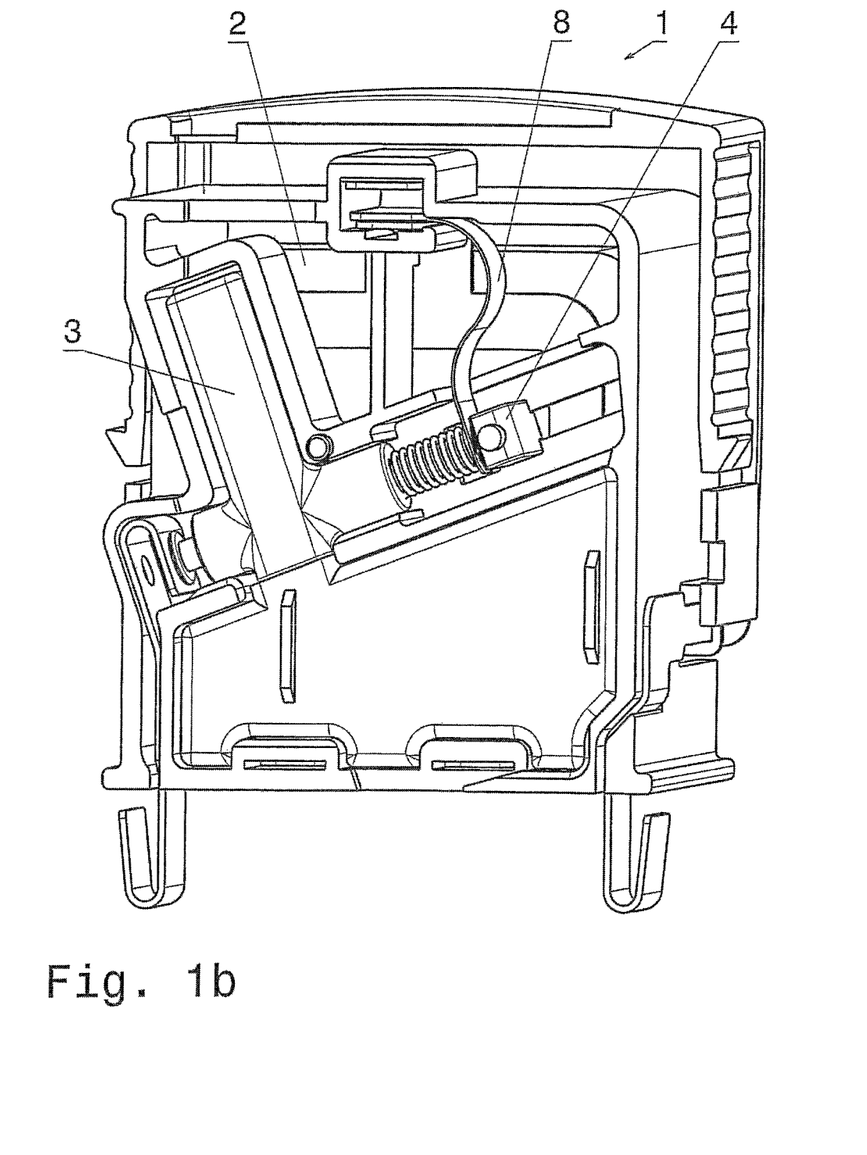
FIG. 1b shows a perspective representation of an overvoltage protection device according to the invention, configured as a plug-in part to be received in a (non-illustrated) base part, wherein the molded body with the switching device as well as the thermal trigger means are located inside the plug-in part.

The plug-in part realized in accordance with the invention comprises the overvoltage protection device 1 with the surge arrester 2, the unlocking slide 4 and the molded body 3 accommodating the switching device. Moreover, plug contacts for the supply of an operating current are provided at the bottom side of the plug-in part. Reference number 8 in FIG. 1b denotes a movable conductor section for closing the electric circuit from the plug contact on the left in the illustration via the switching device to the varistor, and from the varistor to the plug contact on the right in the illustration.

Figure 2A:
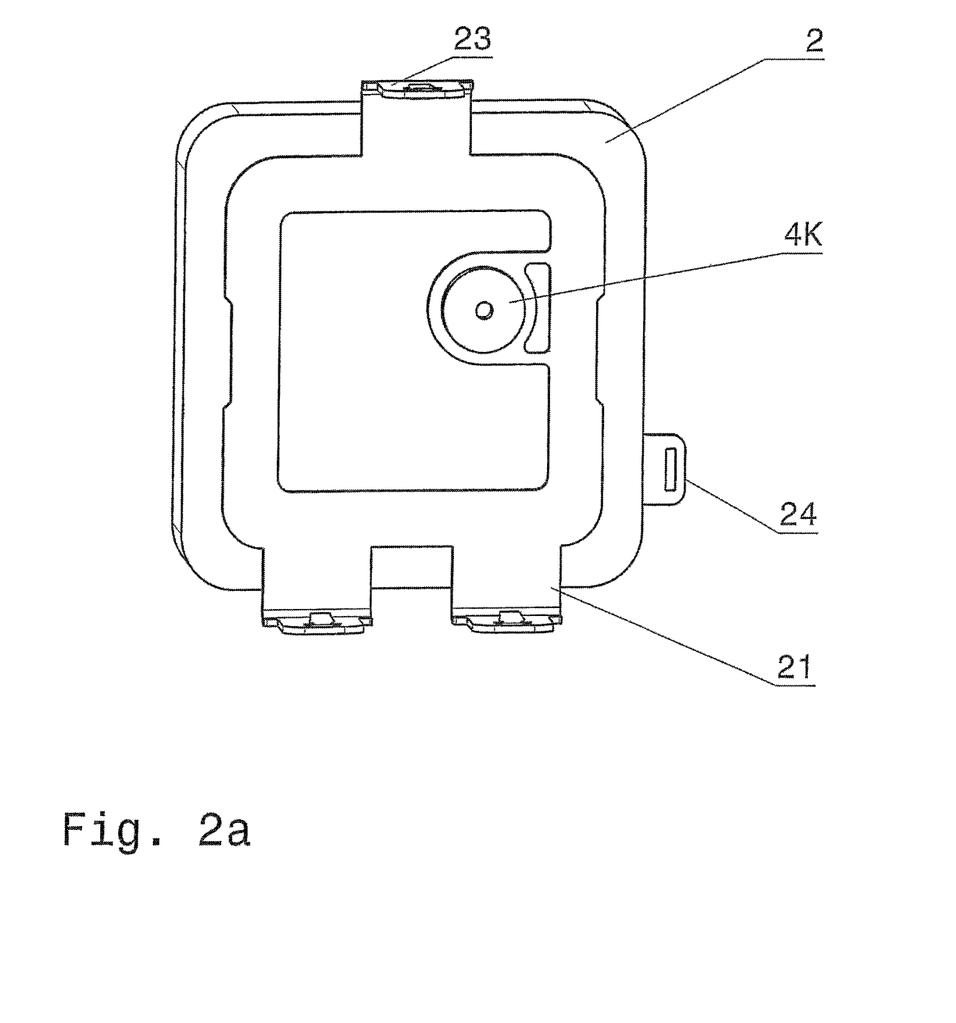
FIG. 2a shows a schematic diagram of a disc-shaped surge arrester, e.g. a varistor, having a frame-type metal surface and a thermal trigger means, e.g. in the form of an insulating body with a conductive coating on one side.

FIG. 2a shows the disc-shaped varistor 2 with a metallic conducting surface 21 applied on same, which extends into an area of an expected strong heating of the varistor 2, with the thermal trigger means 4K being applied in this area.

Figure 2B:
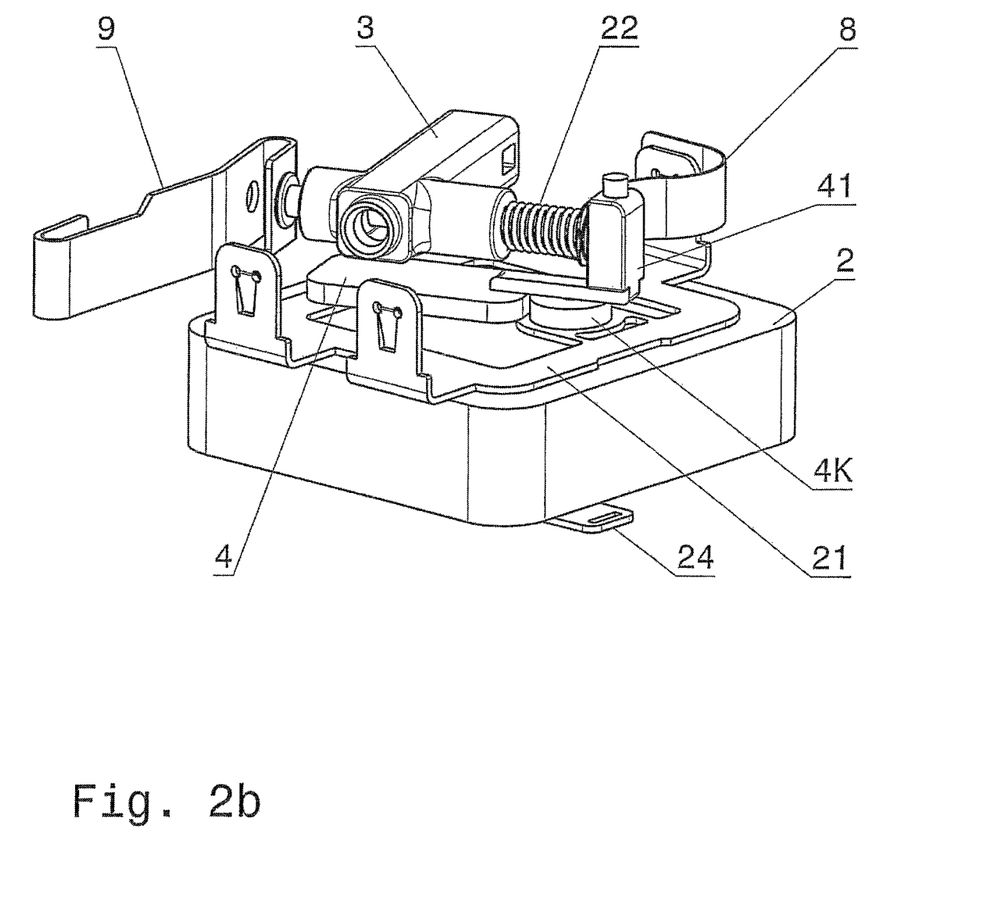
FIG. 2b shows a representation similar to the one of FIG. 2a, but supplemented with a switching device and an unlocking slide in a closed condition.
Figure 2C:
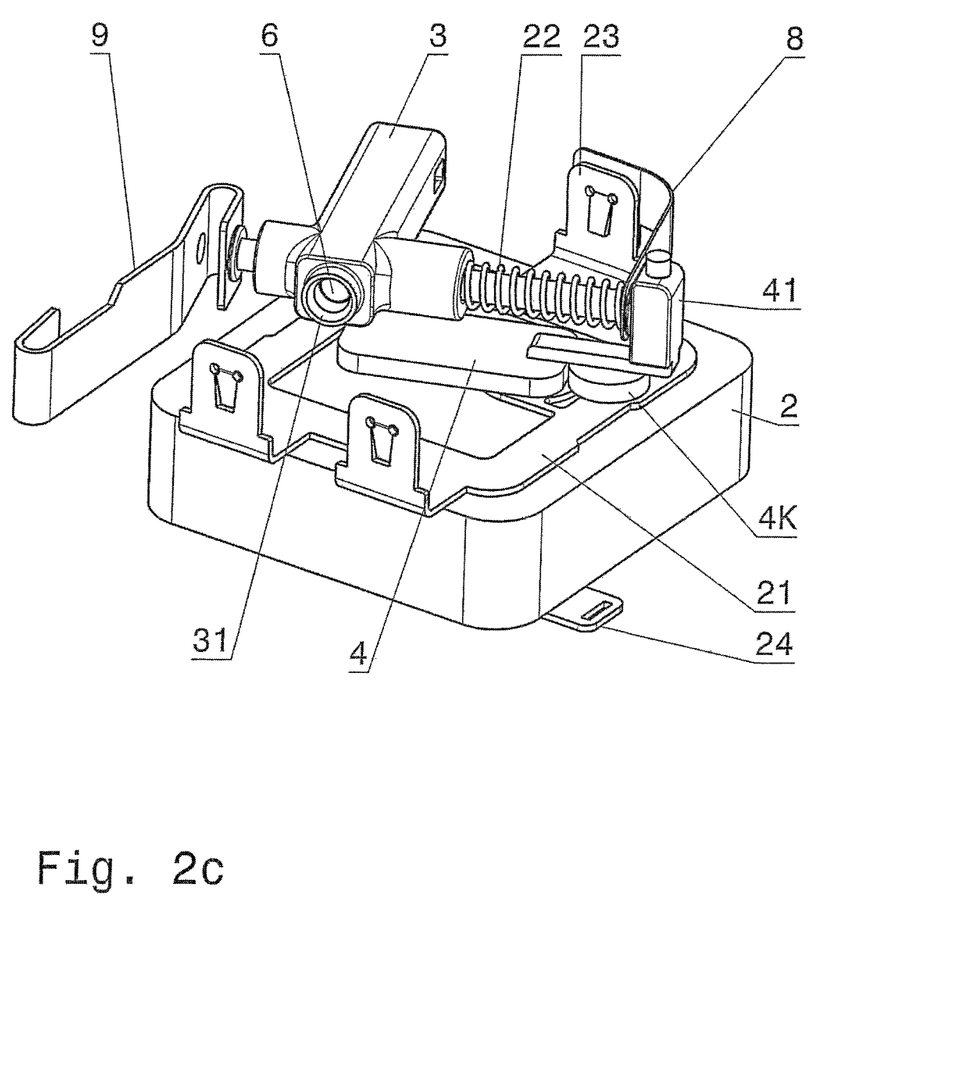
FIG. 2c shows a representation similar to the one of FIG. 2b, but in a condition with a thermally triggered, opened switching device.

FIGS. 2b and 2c show the embodiment of the switching device according to the invention inside a molded body 3.

Figure 3A:
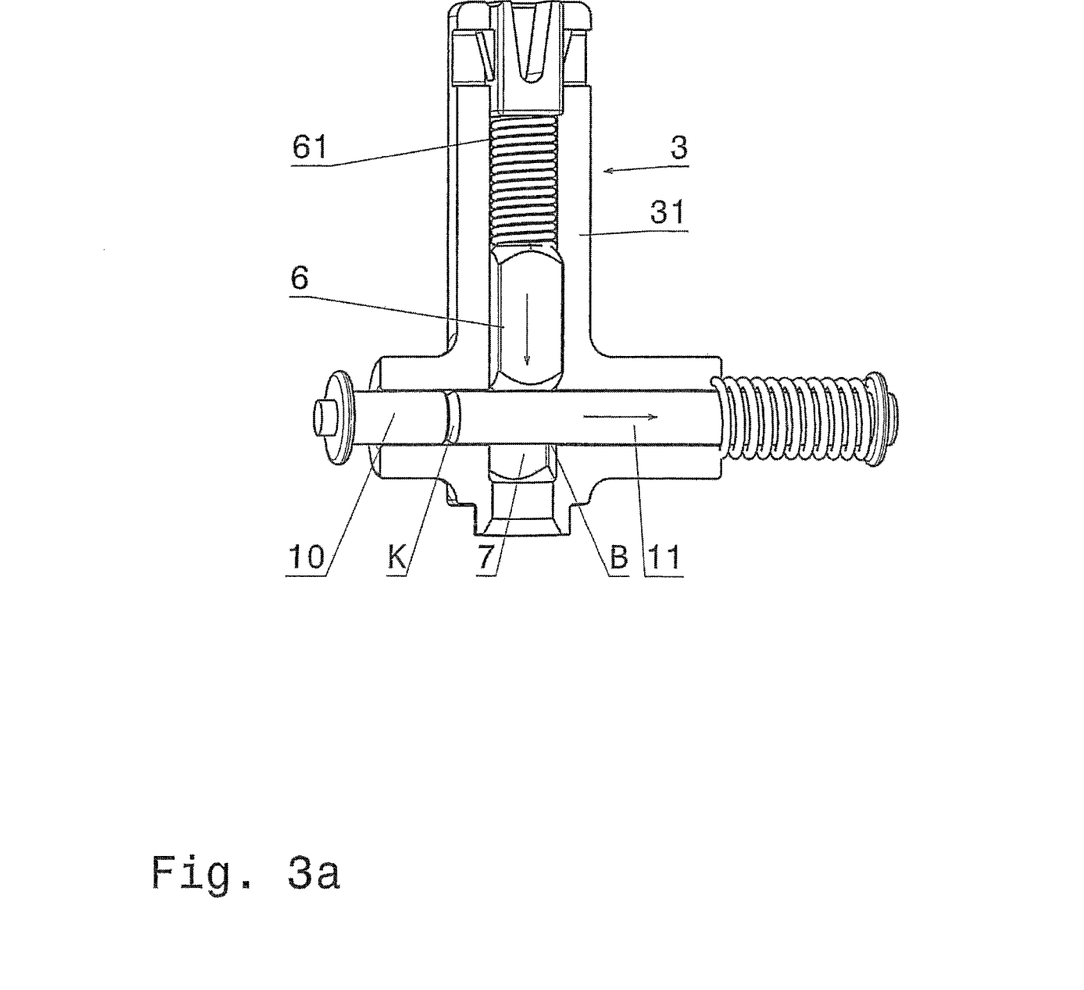
FIG. 3a shows a partially cut off detailed view of the molded body to receive the switching device with the disconnecting member in the closed condition of the switching device.
Figure 3B:
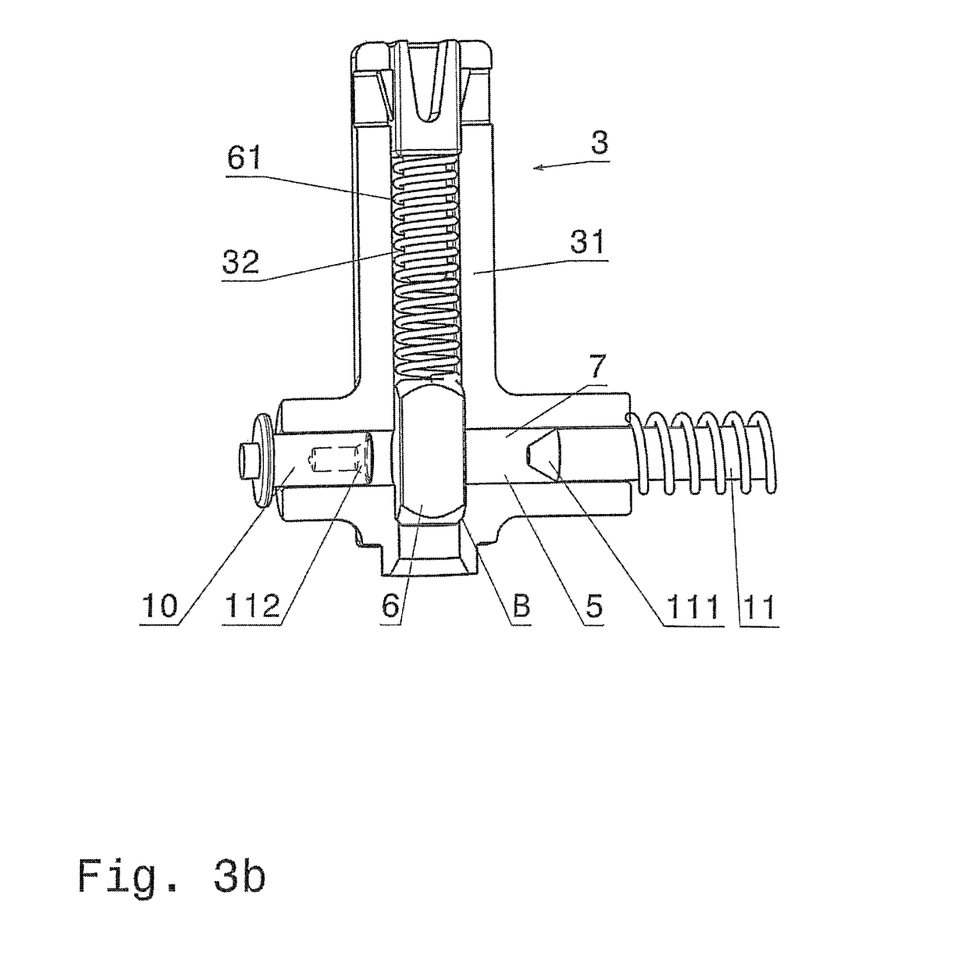
FIG. 3b shows a representation similar to the one of FIG. 3a, but in a condition with the switching device being opened and the disconnecting member penetrated into the distance space.

The switching device comprises contact pieces 10 and 11 (see FIGS. 3a and 3b). In the example shown, contact piece 11 is movably mounted in the molded body 3, preloaded by a spring 22.

In the closed position of the switching device the movable contact piece 11 is pressed against the fixed contact piece 10 and held by the unlocking slide 4 and a nose-type portion 41 provided there.

Thus, the closed condition of the switching device is secured by the means 4 and can be released by the thermal trigger means 4K opening the switching device.

The opened state of the switching device is illustrated in FIG. 2c. In this figure also the movement of the disconnecting member 6 (see FIGS. 3a and 3b) is recognizable whose change of position is shown in the opening-sided portion 31 of the molded body 3.

The disconnecting member 6 thus penetrates into the resulting distance space (see FIG. 3a) of the contact pieces 10 and 11, wherein the disconnecting member 6 is preloaded by a further spring 61 so as to penetrate into the distance space fast and well-directed in the opening case.

The molded body 3 has a shoulder 31 which is oriented at an angle that deviates from the direction of motion of the movable contact piece 11.

The shoulder 31 comprises a hollow space 32 to receive the disconnecting member 6. The surfaces of the contact pieces 10 and 11 which are facing towards each other may have a cone contour 111 with an associated conical recess 112 in the mating contact piece. This increases the current transition surface and reduces the transition resistance between the contact pieces 10 and 11.

The flexible electrical connecting means 8 is in communication with the movable contact piece 11, on the one hand, and leads to part 21, in particular to a connecting leg 23 integrally formed there, on the other hand. The other electrical connection 24 of the varistor 2 leads to the plug-in connection according to FIG. 1b on the right.

The distance space with the contact pieces 10 and 11 being open is closed by an arc quenching chamber 7 which is ultimately quasi gas-proof as a result of the movement of the disconnecting member 6.

The switching device is in electrical contact by connection 8 with the voltage-limiting component, i.e. varistor 2, and a molded connection part 9. The molded connection part 9 is part of the plug contact according to FIG. 1b on the left.

The inner contour 5 inside the molded piece 3 corresponds to the outer contour of the movable contact piece 11, taking into account the necessary tolerances for the desired free movability of the respective contact piece.

As shown in the illustrations, the overvoltage-limiting component 2, which is preferably configured as a varistor, is thermally coupled to the unlocking and trigger system by a thermal trigger means 4K. The thermal trigger element 4K is thereby not flown through by a current.

Thus, the embodiment of the thermal trigger element can be chosen completely freely in order to optimize the response behavior and, thus, obtain a good trigger characteristic, namely by a corresponding positioning on the varistor 2 and/or a dimensioning and choice of the material for the thermal trigger element with regard to heat capacity and heat conductivity. The thermal trigger element 4K may be fabricated as a separate part which is permanently fixed to the varistor by means of a solder or a heat-sensitive adhesive. On the other hand, the thermal trigger means itself may be made of a material that is resiliently deformed under the influence of heat.

In most cases a very fast and thermally sensitive trigger characteristic is desired. This can be realized by directly connecting the thermal trigger means with the overvoltage-limiting component in an optimally heat-conducting manner, or by fabricating it from a thermally insulating enveloping material so as to avoid heat losses. Thermally conductive connections to quasi parasitic heat sinks are avoided.

As according to the inventive solution the monitoring circuit Ü is not located in the surge current path S the configuration of the thermal monitoring device can be dimensioned exclusively under the aspect of the failure behavior of the voltage-limiting component.

If a set critical temperature is exceeded the thermal coupling with the overvoltage-limiting element is canceled. The thermal trigger means is moved away by means of the spring force and the unlocking slide 4 so that the switching device is released.

The realized separation of monitoring path Ü and operating and surge current circuit S allow the detection of potential overload fault cases of the surge arrester used in good time, and a switching off can be performed before a destruction, in particular fusing, of the surge arrester(s) takes place and a mains-related short-circuit current occurs.

Due to the self-quenching capacity obtained by the construction of the switching device with a molded body it is also possible to safely switch off a higher overload current or fault current, respectively.

This increased self-quenching capacity is achieved by different constructive elements that were already described above.

In the closed operating condition according to FIG. 3a the current is passed over the contact pieces 10 and 11, with the corresponding contact point K being under a spring preload.

Upon the release of the switching device the contact pieces move apart. Upon reaching position B the aforementioned disconnecting member 6 travels into the arc chamber 7. By the cooling effect associated therewith the arc field strength is strongly increased.

The switching capacity is further enhanced by the choice of the material for the disconnecting member 6 and the material for the molded body 3, which defines the arc chamber, of quenching gas delivering insulating substances. Thus, it is obtained that the arc voltage rises to such an extent that allows the quenching of a considerable fault current or short-circuit current, even in direct current applications.

The encapsulation of the arc chamber 7 effects under the influence of an arc an increase of the internal pressure, which has another positive effect on the switching capacity.

The achieved high contact separation speed of the overall assembly and the large contact distance (see FIG. 3b) further improve the switching properties.

The embodiments according to FIG. 4a, 4b and FIGS. 5a and 5b are based on a solution using, again, an unlocking slide.

In this embodiment, too, the switching device is located inside a molded body 3. According to FIG. 4a the disconnecting member 6 is still in a position secured by means 4K. The opened condition of the switching device with contact parts or contact pieces 10 and 11 is illustrated in FIG. 4b.

Figure 4A:
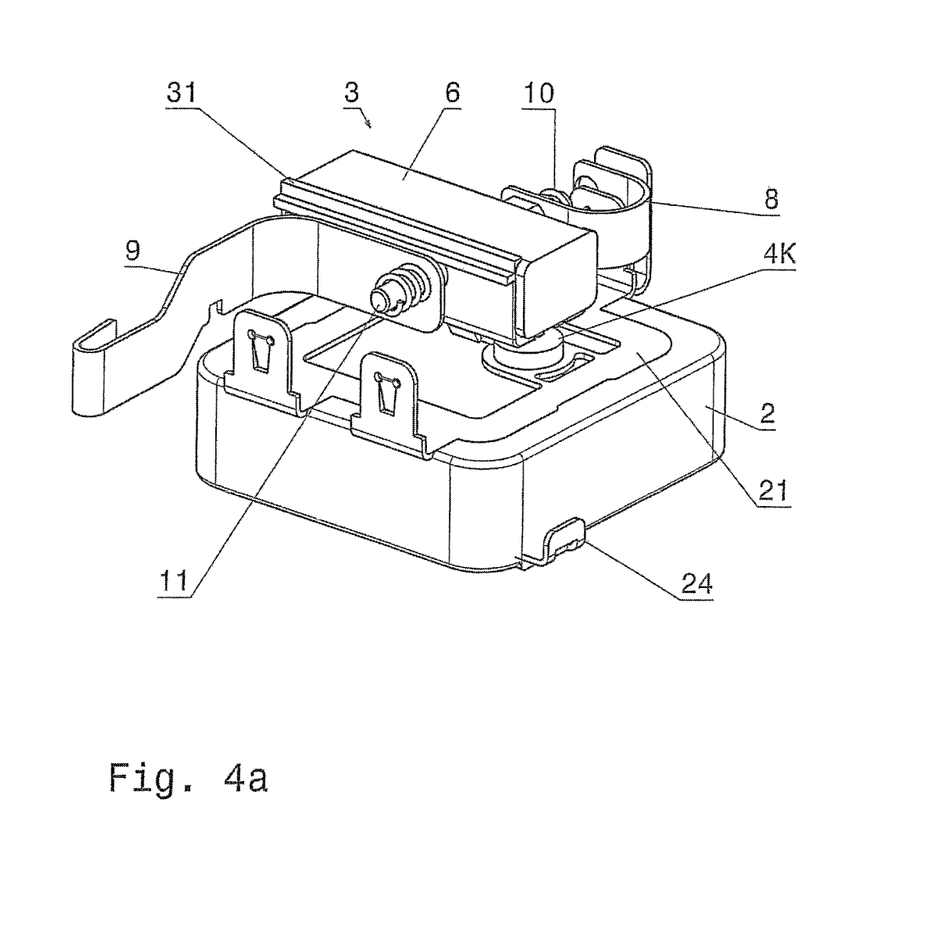
FIG. 4a shows a representation similar to the one of FIG. 2b, but with the further embodiment of the switching device configured as an unlocking slide in the closed condition.
Figure 4B:
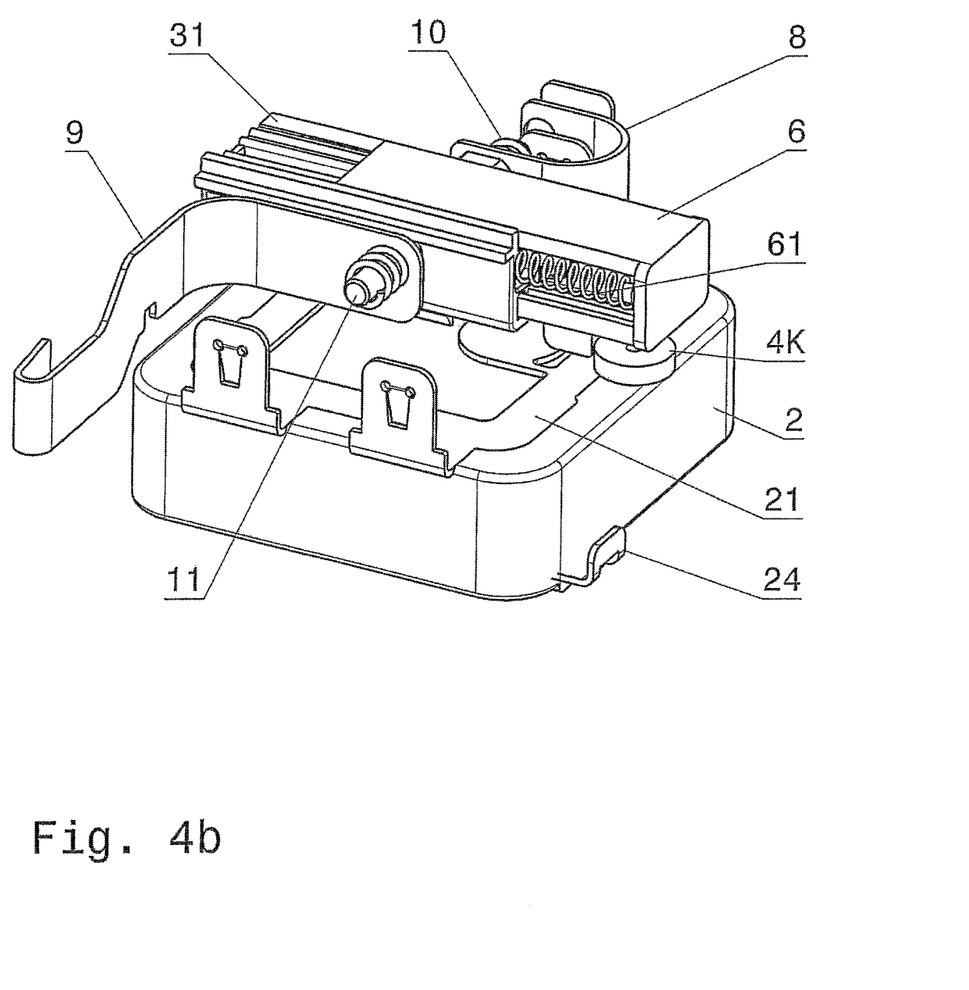
FIG. 4b shows a representation similar to the one of FIG. 4a, but with the unlocking slide in the opened condition.
Figure 5A:
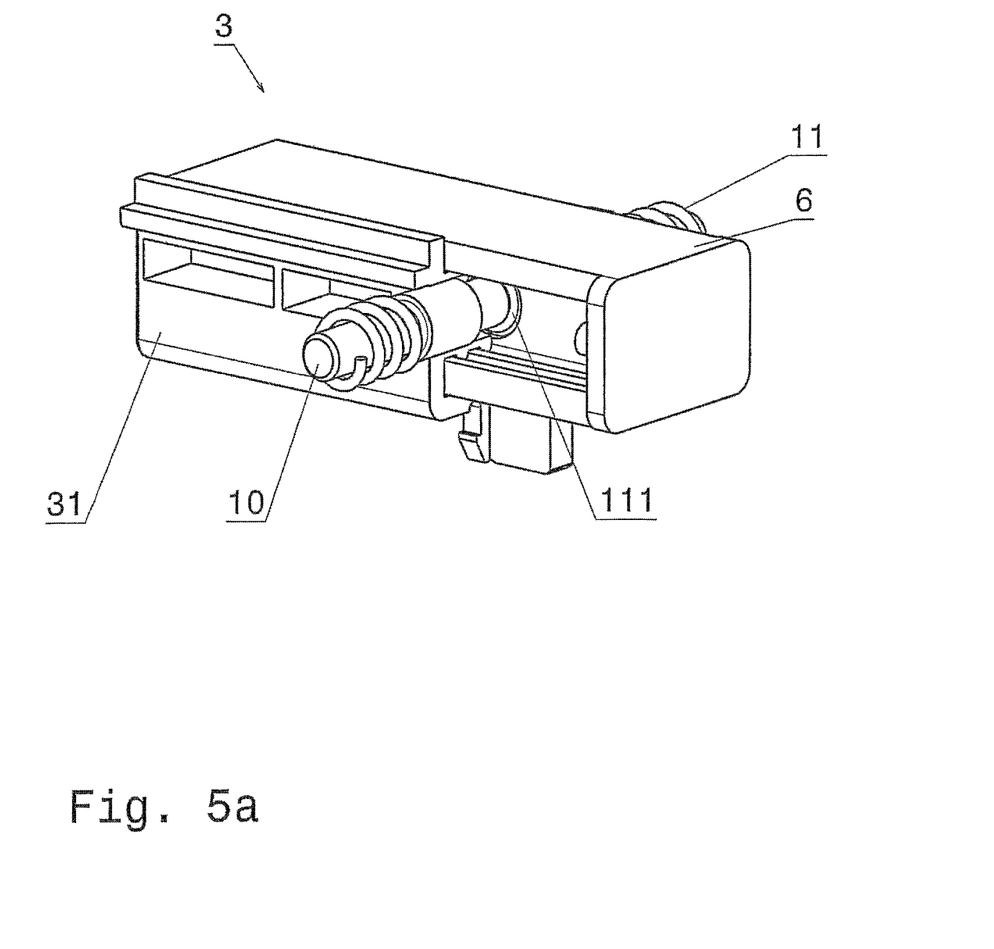
FIG. 5a shows a detailed view of the unlocking slide as shown in FIGS. 4a and 4b, namely partially cut off so as to illustrate the switching device being in the closed condition.
Figure 5B:
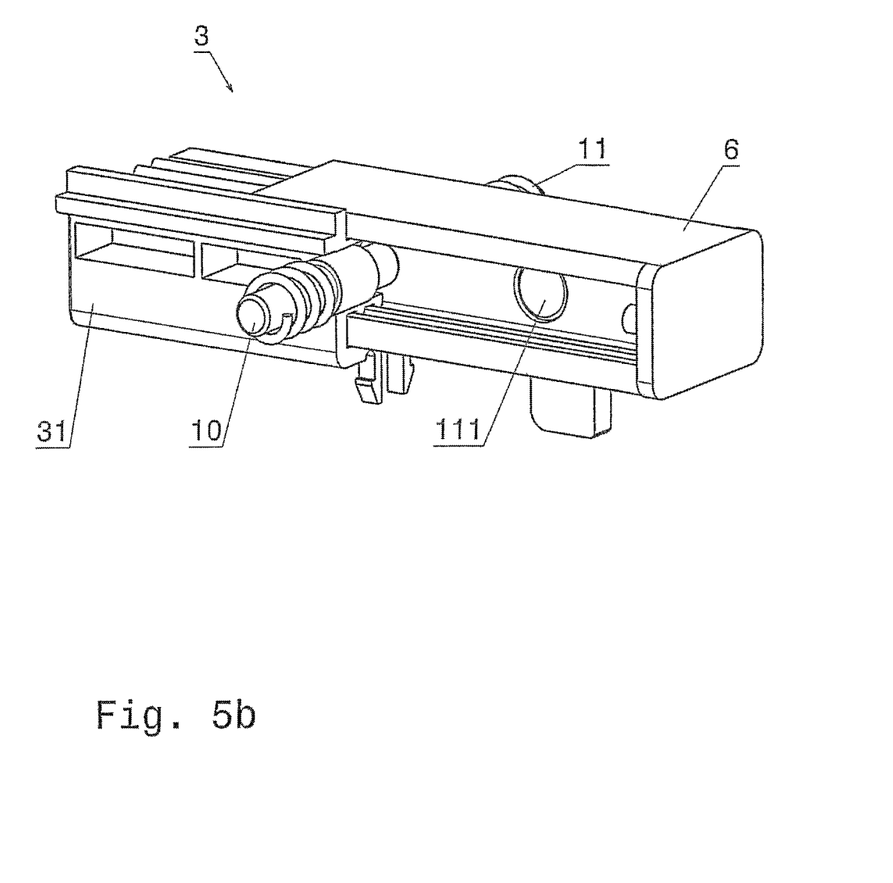
FIG. 5b shows a representation similar to the one of FIG. 5a, but with an opened unlocking slide and the contact element which is integrated in a through hole of the slide.

From a combined consideration of FIGS. 5a and 5b it can be seen how the disconnecting member 6 penetrates between the contact pieces 10 and 11 after the thermal trigger means 4K was released, with the motion of the disconnecting member 6 being supported by means of the preloaded spring 61 (see FIG. 4b).

Also, it can be seen from the representation in FIGS. 5a and 5b that the contact element 111 is here integrated in the slide, respectively disconnecting member 6. This results in the following advantages. First, the arc duration between the contacts 10 and 11 is reduced because no open arc is formed before the slide moves into the distance space between the contact elements 10 and 11. With the same construction size as compared to the above-described embodiment it is possible to realize constructively longer separation distances, i.e. the arrangement can be used for higher voltages. Ultimately, a structure being more simple in terms of production is possible in which the contact element 111 can be positioned in the slide as an insertion part. Hence, the connection of a conical contact element by material engagement is not required.

The invention claimed is:
1. Overvoltage protection device, which comprises:
at least one surge arrester, a thermally triggerable switching device which is connected in series with the surge arrester, the thermally triggerable switching device having an unlocking slide which is movable in a path of motion, and a thermal trigger means operatively coupled to the unlocking slide, wherein the surge arrester and the thermally triggerable switching device form a unit and the thermal trigger means is arranged in an area of the expected heating of the surge arrester when the surge arrester is overloaded and is thermally and mechanically coupled to the surge arrester and releases the unlocking slide in the event of a thermal overload, wherein the thermal trigger means functions as a stop part through which neither operating current nor surge current flows and blocks the path of motion of the unlocking slide which bears against the thermal trigger means, wherein the switching device includes two opposite engaging contact pieces, wherein at least one of the contact pieces is movable in a direction of motion and is spring-preloaded to move in the direction of motion when the switching device changes from a closed condition to an open condition, and wherein the closed condition of the switching device is secured by the unlocking slide and can be released by the thermal trigger means to open the switching device in the event of a thermal overload.

2. Overvoltage protection device according to claim 1, wherein the thermally triggerable switching device further comprises:
a disconnecting member, the disconnecting member being movable between the two opposite contact pieces when the switching device is in the open condition, the contact pieces defining a space therebetween into which the disconnecting member moves when the switching device is in the open condition.

3. Overvoltage protection device according to claim 2, wherein the disconnecting member is subjected to a spring preload so as to penetrate into the space between the contact pieces fast and well-directed when the switching device is in the open condition.

4. Overvoltage protection device according to claim 1, wherein the thermally triggerable switching device further comprises:
a molded body defining an arc chamber, at least portions of the contact pieces being located inside the molded body, wherein the molded body includes a shoulder oriented at an angle that deviates from the direction of motion of the at least one movable contact piece.

5. Overvoltage protection device according to claim 4, wherein the shoulder is provided with a hollow space, and wherein the thermally triggerable switching device includes a disconnecting member movable between the two opposite contact pieces when the switching device is in the open condition, the disconnecting member being received by the hollow space.

6. Overvoltage protection device according to claim 1, wherein the contact pieces of the switching device include surfaces facing towards each other, each of the facing contact surfaces having a contour so as to increase current transition between the facing contact surfaces and reduce transition resistance between the facing contact surfaces.

7. Overvoltage protection device according to claim 6, wherein the facing contact surface of one of the two contact pieces is formed as a cone and the facing contact surface of the other of the two contact pieces is formed as a counter-cone.

8. Overvoltage protection device according to claim 1, wherein the unlocking slide includes a nose-type portion which secures the spring-preloaded movable contact piece of the switching device.

9. Overvoltage protection device according to claim 8, which further comprises:
a flexible electrical connecting means, the flexible electrical connecting means being attached to the spring-preloaded movable contact piece, which is secured by the nose-type portion of the unlocking slide.

10. Overvoltage protection device according to claim 4, wherein at least one of the molded body and the disconnecting member is made of a quenching gas delivering material.

11. Overvoltage protection device according to claim 5, wherein the molded body, the hollow space and the disconnecting member provide a gas-proof seclusion when the switching device is in the open condition and the disconnecting member has penetrated into the space between the contact pieces.

12. Overvoltage protection device according to claim 1, wherein an electrical arc is produced when the at least one movable contact piece of the two contact pieces moves in the direction of motion away from the other contact piece, the arc which is produced having a pressure effect associated therewith, and wherein the movement of the movable contact piece is supported by the pressure effect of the produced arc.

* * * * *